United States Patent
Sherman et al.

(10) Patent No.: US 10,875,720 B2
(45) Date of Patent: Dec. 29, 2020

(54) MODULAR CONVEYOR APPARATUS

(71) Applicant: Creator, Inc., San Francisco, CA (US)

(72) Inventors: Patrick Sherman, Oakland, CA (US); Taylor Nicholson, San Francisco, CA (US); Benjamin Shih, La Jolla, CA (US); Abigail Soong, San Francisco, CA (US)

(73) Assignee: Creator, Inc., San Francisco, CA (US)

( * ) Notice: Subject to any disclaimer, the term of this patent is extended or adjusted under 35 U.S.C. 154(b) by 5 days.

(21) Appl. No.: 16/447,917

(22) Filed: Jun. 20, 2019

(65) Prior Publication Data

US 2019/0389665 A1    Dec. 26, 2019

Related U.S. Application Data

(60) Provisional application No. 62/687,795, filed on Jun. 20, 2018.

(51) Int. Cl.
| | |
|---|---|
| *B65G 35/00* | (2006.01) |
| *B65G 39/12* | (2006.01) |
| *B65G 47/82* | (2006.01) |
| *B65G 39/02* | (2006.01) |

(52) U.S. Cl.
CPC ............ *B65G 39/12* (2013.01); *B65G 39/02* (2013.01)

(58) Field of Classification Search
None
See application file for complete search history.

(56) References Cited

U.S. PATENT DOCUMENTS

| | | | | |
|---|---|---|---|---|
| 5,096,045 | A  * | 3/1992 | Feldl | B65G 15/24 198/583 |
| 6,367,617 | B1 * | 4/2002 | Schiesser | B65G 13/11 198/370.04 |
| 7,168,557 | B2 * | 1/2007 | Mitchell | B65G 17/086 198/852 |
| 8,985,304 | B2 * | 3/2015 | Guernsey | B65G 47/844 198/370.07 |
| 9,573,772 | B2 * | 2/2017 | Fourney | B65G 15/105 |
| 9,598,240 | B2 * | 3/2017 | Mast | B65G 37/005 |
| 9,776,800 | B2 * | 10/2017 | Westergaard Andersen | B65G 17/08 |
| 2009/0250322 | A1 * | 10/2009 | Jager | B65G 21/2063 198/835 |

* cited by examiner

*Primary Examiner* — Kavel Singh
(74) *Attorney, Agent, or Firm* — Harness, Dickey & Pierce, P.L.C.

(57) ABSTRACT

A conveyor assembly includes a motor, a gear assembly operatively coupled to the motor, and a paddle assembly including a plurality of paddles operatively coupled to the gear assembly. Each paddle extends longitudinally between opposing housing walls. Each paddle includes a plurality of blades and a plurality of gaps that are alternatingly disposed along a shaft that extends through a center of each blade. A first portion of paddles includes a first portion of blades and a first portion of gaps. A second portion of paddles includes a second portion of blades and a second portion of gaps. The first portion of blades can rotate through the second portion of gaps. The second portion of blades can rotate through the first portion of gaps. The paddles can sequentially rotate about the respective paddle axes such that each paddle can be disposed at a different angular position than an adjacent paddle.

22 Claims, 11 Drawing Sheets

MODULAR CONVEYOR APPARATUS

CROSS-REFERENCE TO RELATED APPLICATIONS

This application claims the benefit of U.S. Provisional Application No. 62/687,795 filed on Jun. 20, 2018. The entire disclosure of the above application is incorporated herein by reference.

FIELD

The present disclosure relates to a conveyor assembly, a modular conveyor apparatus including a plurality of conveyor assemblies, and methods of using the modular conveyor apparatus.

BACKGROUND

Preparation of foodstuffs (for example, hamburgers, sandwiches, etc.) according to a consumer's custom order can be time-consuming and labor-intensive. Furthermore, the process of preparing custom-ordered foodstuffs is susceptible to errors and wide variations in quality. The present disclosure provides an automated food preparation system that can quickly and accurately prepare foodstuffs according to a wide variety of possible custom orders with limited human involvement.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A conveyor assembly includes a motor, a gear assembly, and a paddle assembly. The gear assembly is operatively coupled to the motor. The paddle assembly includes a housing and a plurality of paddles. The housing includes a first wall and a second wall opposite the first wall. The plurality of paddles is disposed at least partially within the housing. The plurality of paddles is operatively coupled to the gear assembly. Each paddle of the plurality of paddles extends longitudinally between the first wall and the second wall. Each paddle of the plurality of paddles includes a plurality of substantially planar blades, a shaft extending through a center of each blade, and a plurality of gaps. The plurality of blades and the plurality of gaps are alternatingly disposed along the shaft. A first portion of the plurality of paddles includes a first portion of the plurality of blades and a first portion of the plurality of gaps. A second portion of the plurality of paddles includes a second portion of the plurality of blades and a second portion of the plurality of gaps. The first portion of the plurality of blades are configured to rotate through the second portion of the plurality of gaps. The second portion of the plurality of blades are configured to rotate through the first portion of the plurality of gaps. The plurality of paddles is configured to sequentially rotate about the respective plurality of paddle axes such that each paddle is configured to be disposed at a different angular position than an adjacent paddle.

In other features, the plurality of paddles is configured to support an object and translate the object in a lateral direction substantially perpendicular to the paddle axes.

In other features, the gear assembly includes an input gear and a plurality of Geneva mechanisms. Each Geneva mechanism is operatively engaged with a respective paddle of the plurality of paddles. Each Geneva mechanism is configured to rotate the respective paddle about the respective paddle axis by a predetermined increment while maintaining an orientation of at least one other paddle.

In other features, the predetermined increment is about 180°.

In other features, the gear assembly further includes a toothed belt configured to operatively engage the input gear and the plurality of Geneva mechanisms.

In other features, each paddle of the plurality of paddles is configured to have an angular position that is offset from an angular position of an adjacent paddle of the plurality of paddles by greater than or equal to about 85° to less than or equal to about 95°.

In other features, each paddle of the plurality of paddles is coupled to the gear assembly via a respective output coupler assembly such that the paddle is configured to translate along an output axis substantially parallel to the paddle axes and pivot about the output axis.

In other features, each output assembly includes an output gear, a first coupling, and a second coupling. The output gear operatively engages the gear assembly. The first coupling is pivotally coupled to the output gear and configured to rotate together with the output gear. The second coupling is slidably coupled to the first coupling and configured to translate substantially parallel to the output axis. The second coupling is operatively coupled to the respective paddle of the plurality of paddles.

In other features, an orientation of at least one output coupler assembly is angularly offset by about 90° about the respective paddle axis with respect to an adjacent output coupler assembly.

In other features, the paddle assembly is removably coupled to the gear assembly.

In other features, one of the paddle assembly and the gear assembly includes a plurality of pins. The other of the paddle assembly and the gear assembly includes a plurality of receivers. The plurality of pins is configured to be disposed in the plurality of receivers, respectively, to align the paddle assembly with the gear assembly.

In other features, the housing further includes a base connecting the first wall and the second wall. The base extends substantially perpendicular to the first wall and the second wall. The base defines a plurality of openings.

In other features, the base has an X-shaped profile.

In other features, the paddles of the plurality of paddles are configured to cooperate to define a substantially planar surface.

In other features, rotation of the plurality of paddles is configured to be paused such that at least one paddle is disposed at an angle to the substantially planar surface, the angle being greater than or equal to about 45° to less than or equal to about 90°.

In other features, the substantially planar surface defines a plurality openings.

In other features, a plurality of paddles includes six paddles.

A modular conveyor apparatus includes a plurality of conveyor assemblies. The conveyor assemblies of the plurality are disposed laterally adjacent to one another and configured to cooperate to define a substantially planar surface. Each conveyor assembly includes a motor, a gear assembly, and a paddle assembly. The gear assembly is operatively coupled to the motor. The paddle assembly includes a housing and a plurality of paddles. The housing includes a first wall and a second wall opposite the first wall. The plurality of paddles is disposed at least partially within the housing. The plurality of paddles is operatively coupled to the gear assembly. Each paddle of the plurality of paddles extends longitudinally between the first wall and the second wall. Each paddle includes a plurality of substantially planar blades, a shaft extending through a center of each blade, and a plurality of gaps. The plurality of blades and the plurality of gaps are alternatingly disposed along the shaft. A first portion of the plurality of paddles includes a first portion of the plurality of blades and a first portion of the plurality of gaps. A second portion of the plurality of paddles includes a second portion of the plurality of blades and a second portion of the plurality of gaps. The first portion of the plurality of blades is configured to rotate through the second portion of the plurality of gaps. The second portion of the plurality of blades is configured to rotate through the first portion of the plurality of gaps. The plurality of paddles is configured to sequentially rotate about the respective plurality of paddle axes such that each paddle is configured to be disposed at a different angular position than an adjacent paddle.

In other features, the plurality of paddles of each respective conveyor assembly is configured to rotate independent of the plurality of paddles of each other conveyor assembly.

In other features, the respective gear assembly of each conveyor assembly includes an input gear and a plurality of Geneva mechanisms. Each Geneva mechanism is operatively engaged with a respective paddle of the plurality of paddles. Each Geneva mechanism is configured to rotate the respective paddle about the respective paddle axis by a predetermined increment.

In other features, the pluralities of paddles of each respective conveyor assembly are configured to cooperate to support an object and translate the object in a lateral direction substantially perpendicular to the paddle axes.

In other features, each conveyor assembly of the plurality of conveyor assemblies is configured to be operated independently of each other conveyor assembly of the plurality of conveyor assemblies.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
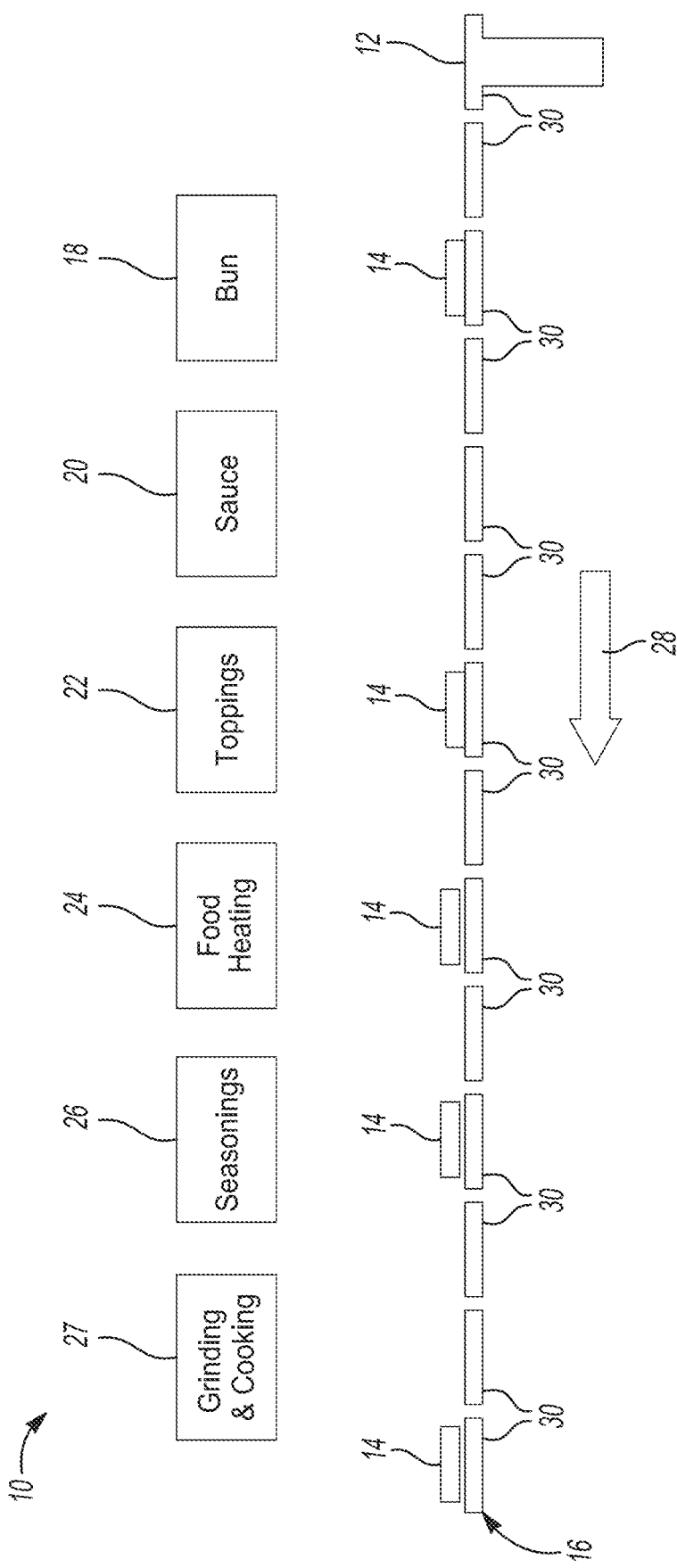
FIG. 1 is a schematic representation of an automated food preparation system according to the principles of the present disclosure.

Referring to FIG. 1, an example of an automated food preparation system 10 according to various implementations of the present disclosure is shown. The automated food preparation system 10 includes one or more stations, such as a box-dispensing apparatus 12 for placing a box 14 onto a modular conveyance apparatus 16. The automated food preparation system 10 further includes a bun-dispensing apparatus 18, a sauce-dispensing apparatus 20, a toppings-dispensing apparatus 22, a food-heating apparatus 24, a seasonings apparatus 26, and a grinding and cooking apparatus 27. The modular conveyance apparatus 16 transports the box 14 in a first or lateral direction 28 to deliver it to one or more of the apparatuses 18, 20, 22, 24, 26, 27.

In one example, the box-dispensing apparatus 12 places a box, such as the box 14, on the modular conveyance apparatus 16. The bun-dispensing apparatus 18 slices, toasts, and butters a bun, then dispenses the bun in the box 14. The sauce-dispensing apparatus 20 dispenses sauce on the bun. The toppings-dispensing apparatus 22 prepares toppings, such as by slicing or grating, and dispenses the toppings on the bun. In various implementations, the toppings-dispensing apparatus 22 grates cheese and dispenses it on the bun. The food-heating apparatus 24 heats the cheese to melt the cheese onto the bun. The seasonings apparatus 26 dispenses seasonings onto the bun. The grinding and cooking apparatus 27 grinds a protein, such as meat, forms a patty, cooks the patty, and deposits it onto the bun. Each of the stations may include multiple subsystems. Furthermore, the automated food preparation system 10 may include different or additional systems and subsystems.

The modular conveyance apparatus 16 includes a plurality of conveyor assemblies 30. In various implementations, the plurality of conveyor assemblies 30 may include thirteen (13) conveyor assemblies 30. Each conveyor assembly 30 moves the box 14 in the first direction 28. The box 14 may be passed to an adjacent conveyor assembly 30 or another surface, such as a tray. In various implementations, the conveyor assembly 30 may cease operation to retain the box 14 in a position on the conveyor assembly 30.

Each conveyor assembly 30 can be operated independent of the other conveyor assemblies 30. Thus, when the automated food preparation system 10 includes multiple boxes 14, each box 14 being at a different station, the boxes 14 need not progress through the automated food preparation system 10 at the same rate. Furthermore, each conveyor assembly 30 may be operated independent of each other conveyor assembly 30 such that a single conveyor assembly 30 can be removed and replaced without affecting operation of the other conveyor assemblies 30.

Although the automated food preparation system 10 includes thirteen (13) conveyor assemblies 30, a modular conveyor system according to the principles of the present disclosure can include any quantity of conveyor assemblies 30, depending on a length of conveyor or quantity of discrete stopping points required. In various implementations, a modular conveyor system includes a single conveyor assembly 30. Moreover, the modular conveyor system 16 can be used to transport other items and is therefore not limited to burgers or foodstuffs.

Figure 2:
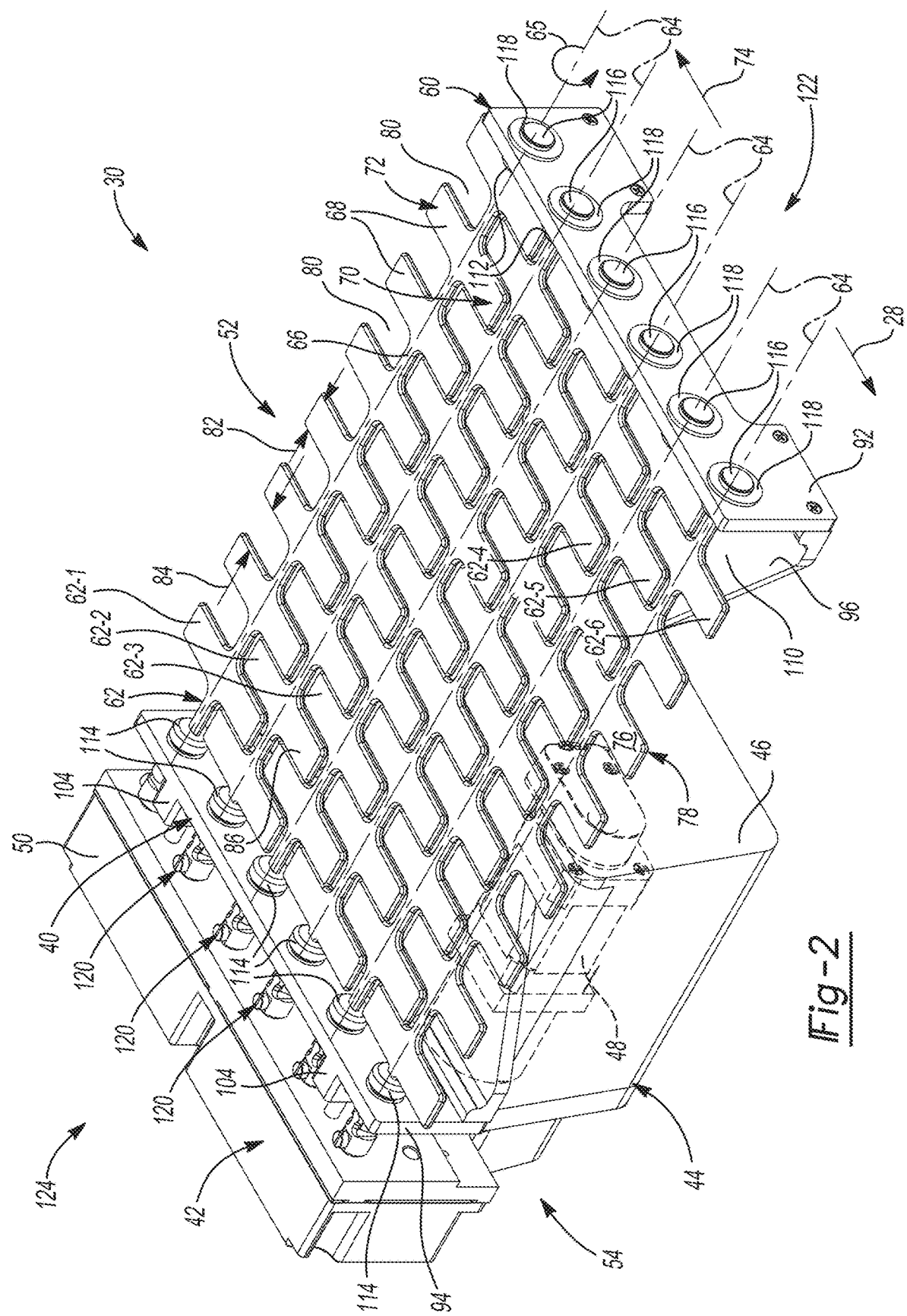
FIG. 2 is a perspective view of a conveyor assembly of the food preparation system of FIG. 1.

With reference to FIG. 2, an example of the conveyor assembly 30 according to various implementations of the present disclosure is provided. The conveyor assembly 30 includes a paddle assembly 40, a gear assembly 42 that is operatively connected to the paddle assembly 40, and an electronics assembly 44 that is operatively connected to the gear assembly 42. The electronics assembly 44 includes an electronics housing 46 that at least partially encloses a motor 48 and electronics (not shown). The gear assembly 42 includes a gear housing 50. The gear assembly 42 is configured to transmit power from a motor 48 to the paddle assembly 40. The paddle assembly 40 is configured to transport an object, such as the box 14 (FIG. 1), in the first direction 28, from a first side 52 of the conveyor assembly 30 to a second side 54 of the conveyor assembly 30.

The paddle assembly 40 generally includes a paddle housing 60 and a plurality of paddles 62. The paddles 62 are disposed at least partially within the paddle housing 60 and arranged sequentially in the lateral direction 28. Each paddle 62 is configured to rotate about a paddle axis 64. During operation, the paddles 62 rotate in a first rotational direction 65 about the respective paddle axes 64. The paddles 62 are configured to rotate sequentially such that they begin respective rotation cycles at different times to move the box 14 in the first direction 28. The paddles 62 are not independently connected to the motor 48. Thus, an angular position of each paddle 62 is related to the angular position of each other paddle 62.

In various implementations, the plurality of paddles 62 may include six paddles: a first paddle 62-1, a second paddle 62-2, a third paddle 62-3, a fourth paddle 62-4, a fifth paddle 62-5, and a sixth paddle 62-6. The first paddle 62-1 is disposed on the first side 52 of the conveyor assembly 30. The second paddle 62-2 is disposed adjacent to the first paddle 62-1 in the first direction 28. The third paddle 62-3 is disposed adjacent to the second paddle 62-2 in the first direction 28. The fourth paddle 62-4 is disposed adjacent to the third paddle 62-3 in the first direction 28. The fifth paddle 62-5 is disposed adjacent to the fourth paddle 62-4 in the first direction 28. The sixth paddle 62-6 is disposed adjacent to the fifth paddle 62-5 in the first direction 28. The sixth paddle 62-6 is disposed at the second side 54 of the conveyor assembly 30. The paddle assembly may include other quantities of paddles, such as a single paddle or greater than six paddles.

Each paddle 62 includes a shaft 66 and a plurality of blades 68 (see, for example, the first paddle 62-1). The shaft 66 extends along the paddle axis 64. The blades 68 are longitudinally spaced apart along the shaft 66. Specifically, the blades 68 are equally spaced along the paddle axis 64. The shaft 66 extends through a center of each blade 68. Accordingly, each blade 68 includes a first portion 70 that extends from the shaft 66 in the first direction 28 when the paddle 62 is in a horizontal orientation and a second portion 72 that extends from the shaft in a second direction 74 opposite the first direction 28 when the paddle 62 is in the horizontal orientation (see, for example, the first paddle 62-1).

Each paddle 62 includes a first surface 76 and a second surface 78 opposite the first surface 76 (see, for example, the sixth paddle 62-6). Each paddle 62 has a substantially uniform thickness between the first surface 76 and the second surface 78. The blades 68 are substantially planar. Each blade 68 may be substantially rectangular and have rounded corners. The first portions 70 may be substantially mirror images of the second portions 72.

The blades 68 are separated by gaps 80 such that the blades 68 and gaps 80 are alternatingly disposed along the shaft 66 (see, for example, the first paddle 62-1). A shape of the gap 80 may complement a shape of the blade 68. The blades 68 define a first width 82 parallel to the paddle axis 64 and the gaps 80 define a second width 84. The second width 84 is greater than the first width 82 so that the blades 68 of one paddle 62 are configured to rotate through the gaps 80 of an adjacent paddle 62. However, the first and second widths 82, 84 may be similar so that the blades 68 fit as closely as possible within the gaps 80 without physically engaging the blades 68. By way of example, the first portions 70 of the blades 68 of the second paddle 62-2 are disposed within and configured to rotate through respective gaps 80 of the third paddle 62-3. The second portions 72 of the blades 68 of the second paddle 62-2 are disposed within and configured to rotate through respective gaps 80 of the first paddle 62-1. When the first or second surfaces 76, 78 of each paddle 62 are coplanar, that is, each paddle 62 is disposed in a substantially horizontal orientation, the paddles 62 cooperate to form a conveyor surface 86.

The first, third, and fifth paddles 62-1, 62-3, 62-5 may be substantially identical to one another. Specifically, the blades 68 and gaps 80 of the first, third, and fifth paddles 62-1, 62-3, 62-5 may be disposed at the same longitudinal positions (that is, positions along the respective paddle axis 64). The first, third, and fifth paddles 62-1, 62-3, 62-5 may be referred to as a first portion of the plurality of paddles 62. The first portion of the plurality of paddles includes a first portion of the blades 68 and a first portion of the gaps 80.

The second, fourth, and sixth paddles 62-2, 62-4, 62-6 may be substantially identical to one another. The blades 68 of the second, fourth, and sixth paddles 62-2, 62-4, 62-6 may be disposed at the same longitudinal positions. The second, fourth, and sixth paddles 62-2, 62-4, 62-6 may be referred to as a second portion of the plurality of paddles 62. The second portion of the plurality of paddles includes a second portion of the blades 68 and a second portion of the gaps 80.

The first, third, and fifth paddles 62-1, 62-3, 62-5 of the first portion of the plurality are arranged in a blade-gap-blade manner. The second, fourth, and sixth paddles 62-2, 62-4, 62-6 of the second paddle are arranged in a gap-blade-gap. Thus, the first portion of the blades 68 are configured to rotate through the second portion of the gaps 80. The second portion of the blades 68 are configured to rotate through the first portion of the gaps 80.

Figure 3:
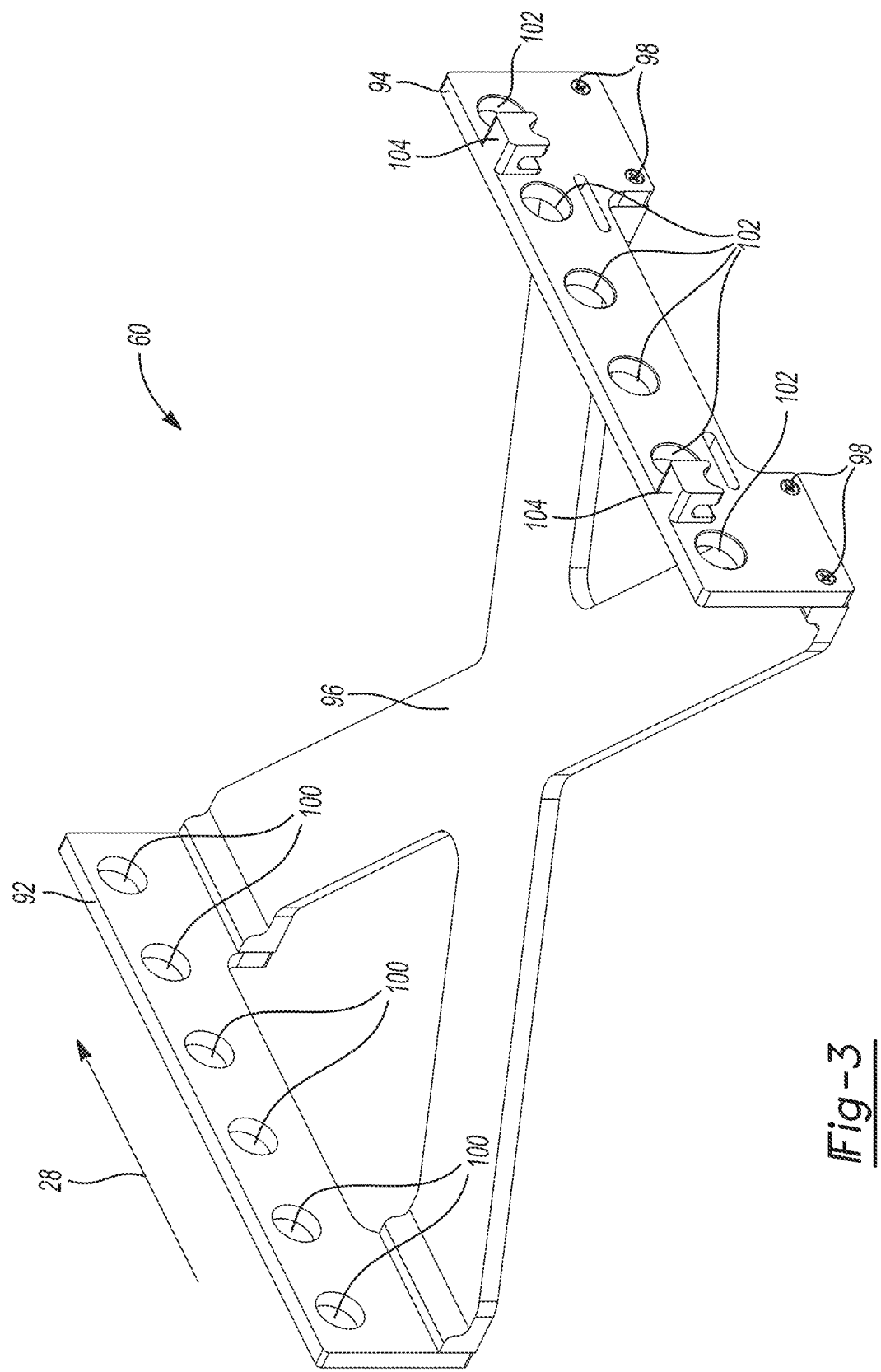
FIG. 3 is a perspective view of a housing of a paddle assembly of the conveyor assembly of FIG. 2.

The paddles 62 are rotatably connected to the paddle housing 60. As shown in FIG. 3, the paddle housing 60 includes first or front wall 92, a second or rear wall 94, and a base 96 extending between the front wall 92 and the rear wall 94. Each paddle 62 extends longitudinally between the front wall 92 and the rear wall 94. The base 96 extends substantially perpendicular to the front and rear walls 92, 94. The front wall 92 and the rear wall 94 are each connected to the base 96 by a plurality of fasteners 98. In alternative implementations, a paddle housing may be formed from one piece. In other alternative implementations, a paddle housing may include greater than three components.

The base 96 has a substantially X-shaped profile parallel to a surface (not shown) on which the conveyor assembly 30 is disposed. The X-shaped profile advantageously allows unused food to fall through the paddle assembly 40. However, a base may define other shapes, such as a rectangle, an I-shaped profile, or a T-shaped profile, by way of example.

The front wall 92 includes a first plurality of apertures 100 and the rear wall 94 includes a respective second plurality of apertures 102. Each paddle 62 may extend between a respective pair of first and second apertures 100, 102. Thus, the first and second apertures 100, 102 have centers that are aligned along respective paddle axes 64 (FIG. 2). The rear wall 94 includes a pair of locating pin receivers 104 for physical engagement with the gear assembly 42, as described in greater detail below.

Returning to FIG. 2, a clearance 110 may be defined between the paddles 62 and the base 96 of the paddle housing 60. Thus, the paddles 62 can rotate 360° about the respective paddle axes 64 without interference from the base 96. A first plurality of annular covers 112 is disposed between the respective plurality of paddles 62 and the front wall 92. A second plurality of annular covers 114 is disposed between the respective plurality of paddles 62 and the rear wall 94. The annular covers 112, 114 may prevent or reduce an amount of food debris from entering joints.

Figure 4A:
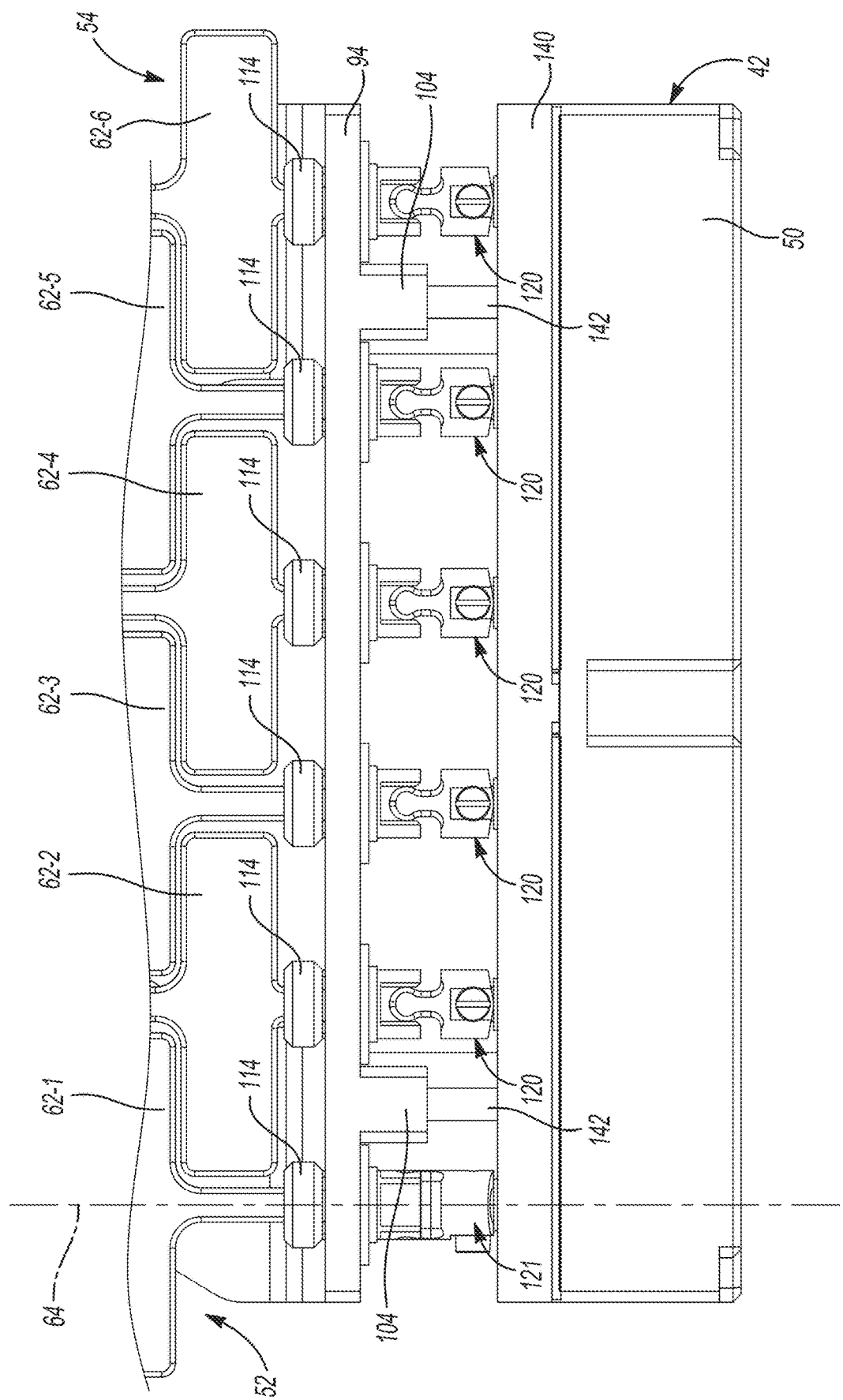
FIG. 4A is a partial top view of the conveyor assembly of FIG. 2.
Figure 5:
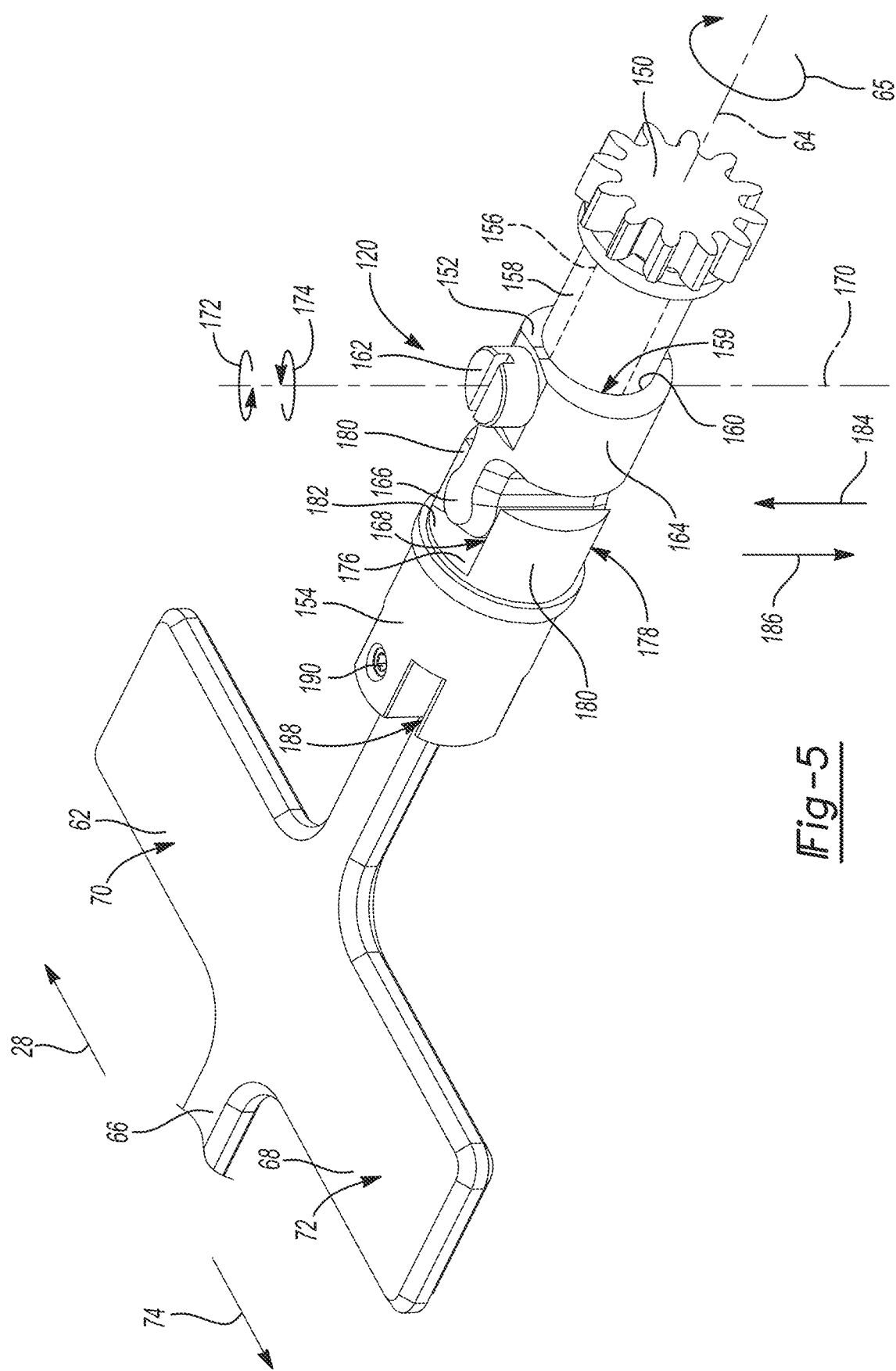
FIG. 5 is a partial perspective view of a paddle and an output coupler assembly of the paddle assembly of FIG. 2.
Figure 6:
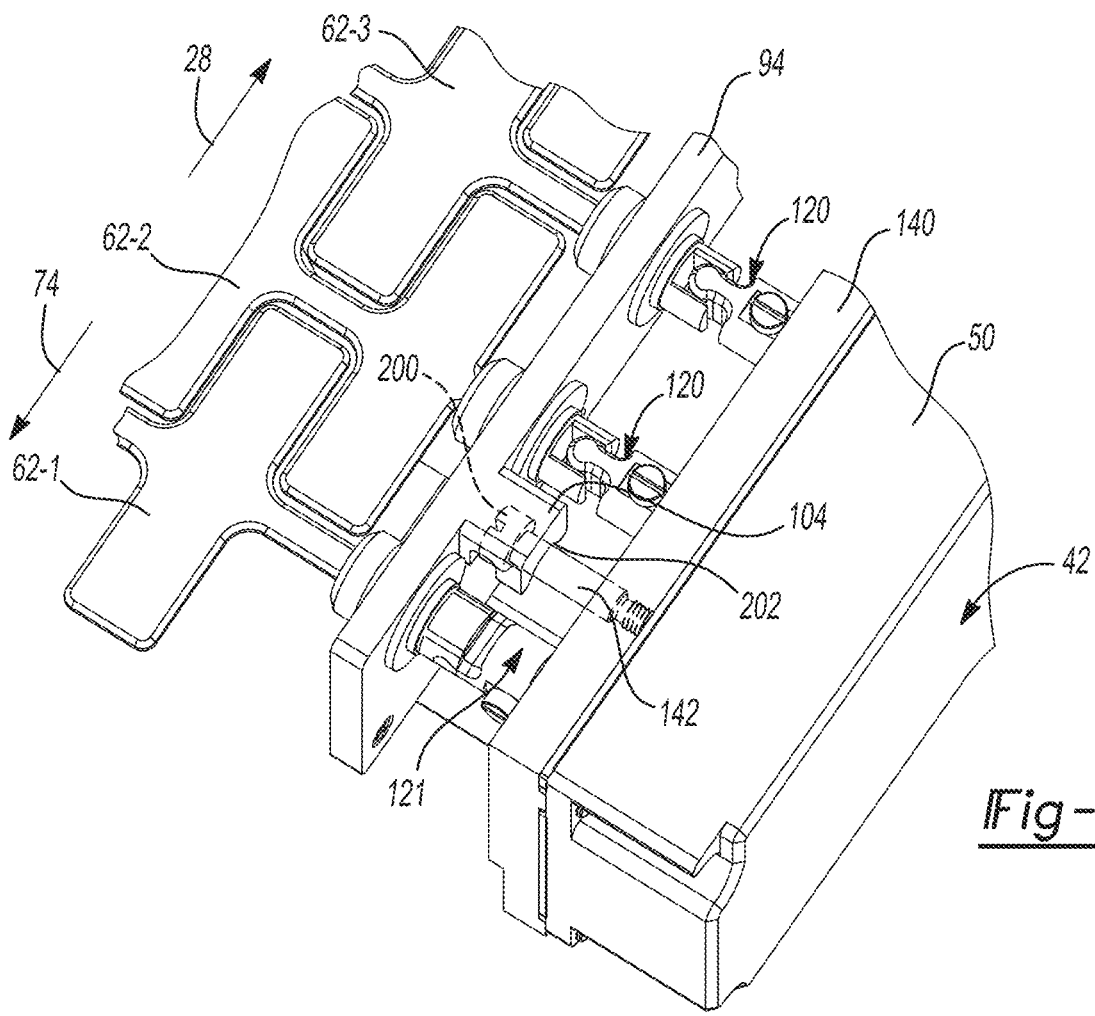
FIG. 6 is a partial perspective view of the conveyor assembly of FIG. 2.

Each paddle 62 may be coupled to an end cap 116 that engages a first sleeve bearing 118. The first sleeve bearings 118 are disposed in respective apertures 100 of the first plurality. The paddle 62 is coupled to the end cap 116, such as by a fastener (not shown), so that the end cap 116 rotates together with the paddle 62. Each paddle 62 is operatively coupled to the gear assembly 42 by an output coupler assembly 120, discussed in greater detail below (FIGS. 4A and 5-6). In alternative implementations, a bearing can be machined directly into a paddle or a front wall and therefore need not be a separate component.

When the conveyor assembly 30 is included in the automated food preparation system 10, the front wall 92 of the base 96 may be disposed toward a patron waiting for a burger. Thus, the front wall 92 is disposed at a front side 122 of the conveyor assembly 30. The gear housing 50 is disposed at a rear side 124 of the conveyor assembly 30. In alternative implementations, the rear wall 94 may face the patron.

The paddle assembly 40 is removable from the conveyor assembly 30, such as for cleaning. The paddle assembly 40 can therefore be removed while the electronics assembly 44 and the gear assembly 42 remain in place. The above configuration advantageously reduces the opportunity for breaking electrical connections, causing misalignment in the gear assembly 42, and other issues.

Referring to FIGS. 4A and 5-6, the second, third, fourth, fifth, and sixth paddles 62-2, 62-3, 62-4, 62-5, 62-6 each include the output coupler assembly 120. The first paddle 62-1 includes an output coupler assembly 121. The output coupler assembly 121 is similar to the output coupler assembly 120, but rotated about 90° about the paddle axis 64.

The output coupler assemblies 120, 121 extend through apertures (not shown) in a partition 140 to operatively couple the paddles 62 to the gear assembly 42. The partition 140 is disposed between the gear assembly 42 and the paddle assembly 40 (FIG. 2). The partition 140 includes a pair of locating pins 142 that extend toward the front side 122 (FIG. 2) of the conveyor assembly 30. The locating pins 142 engage the locating pin receivers 104 on the paddle housing 60.

As shown in FIG. 5, the output coupler assembly 120 generally includes an output gear 150, a first or pivotal coupling 152, and a second or translatable coupling 154. The output gear 150 is disposed within the gear housing 50. An output gear shaft 156 extends from the output gear 150, through the partition 140 (FIG. 4A), and toward the front side 122 of the conveyor assembly 30. A second sleeve bearing 158 is disposed around the output gear shaft 156. The second sleeve bearing 158 is at least partially disposed within the aperture (not shown) of the partition 140. In alternative implementations, a sleeve bearing is machined directly into the paddle 62 or the partition 140 and is therefore not a separate component. A distal end 159 of the output gear shaft 156 is disposed within a first receptacle 160 of the pivotal coupling 152. A first pin 162 pivotally connects the output gear shaft 156 to the pivotal coupling 152.

The pivotal coupling 152 includes an annular body 164 and a protrusion 166. The first receptacle 160 is formed in the annular body 164 and opens toward the rear side 124 of the conveyor assembly 30. The protrusion 166 extends from the annular body 164 toward the front side 122 of the conveyor assembly 30. The protrusion includes a rounded proximal surface 168. The pivotal coupling 152 is configured to pivot about an output coupler axis 170 in a second rotational direction 172 and a third rotational direction 174 opposite the second rotational direction 172. The second and third rotational directions 172, 174 are each substantially perpendicular to the first rotational direction 65. The protrusion 166 of the pivotal coupling 152 slidingly engages a slot 176 of the translatable coupling 154.

The translatable coupling 154 includes a forked portion 178 having a pair of arms 180. The arms 180 are spaced apart to define the slot 176. The arms 180 are symmetric about the paddle axis 64. In various implementations, the rounded proximal surface 168 of the protrusion 166 directly engages a surface 182 of the forked portion 178. The translatable coupling 154 is configured to translate with respect to the pivotal coupling 152. Specifically, the translatable coupling 154 is configured to translate in a third direction 184 substantially parallel to the output coupler axis 170 and a fourth direction 186 opposite the third direction 184. The third and fourth directions 184, 186 are substantially parallel to the first and second directions 28, 74.

The translatable coupling 154 further includes a second receptacle 188 that opens toward the front side 122 of the conveyor assembly 30. The paddle 62 is at least partially disposed within the second receptacle 188. The paddle 62 is coupled to the translatable coupling 154 with a second fastener 190. The second fastener 190 prevents the paddle from translating along the paddle axis 64 out of the second receptacle 188. Surfaces of the second receptacle 188 operatively engage the shaft 66 of the paddle 62.

The output coupler assembly 120 includes two degrees of freedom: i) a rotational degree of freedom between the output gear shaft 156 and the pivotal coupler 152, and ii) a linear degree of freedom at a U-joint between the pivotal coupler 152 and the translatable coupler 154. The degrees of freedom in the output coupler assembly 120 permit imperfect axial alignment between the output gear shaft 156 of the gear assembly 42 and the paddle shaft 66 of the paddle assembly 40. That is, the conveyor assembly 30 can still function when the gear and paddle assemblies 42, 40 are not perfectly aligned. Therefore, the paddle assembly 40 can be removed for cleaning and reassembled to the gear assembly 42 with a minimized chance of misalignment that leads to malfunction and downtime of the conveyor assembly 30.

With reference to FIGS. 4A and 6, the output coupler assembly 121 of the first paddle 62-1 is angularly rotated with respect to the output coupler assemblies 120 of the other paddles 62-2, 62-3, 62-4, 62-5, 62-6. To install or remove the paddle assembly 40 from the electronics assembly 44, the first paddle 62-1 is rotated about 90° in the first rotational direction 65 (FIG. 2). Rotating the first paddle 62-1 by 90° orients the first paddle 62-1 vertically, reducing a width of the paddle assembly 40 parallel to the first direction 28. The reduction in width is advantageous during removal and installation or reassembly because it provides clearance between the first side 52 of the paddle assembly 40 and a second side of an adjacent paddle assembly (FIG. 1) or another component. As discussed in greater detail below, the conveyor assembly 30 can be placed into a "cleaning mode" to rotate the first paddle 62-1 by 90° in the first rotational direction 65.

Figure 4B:
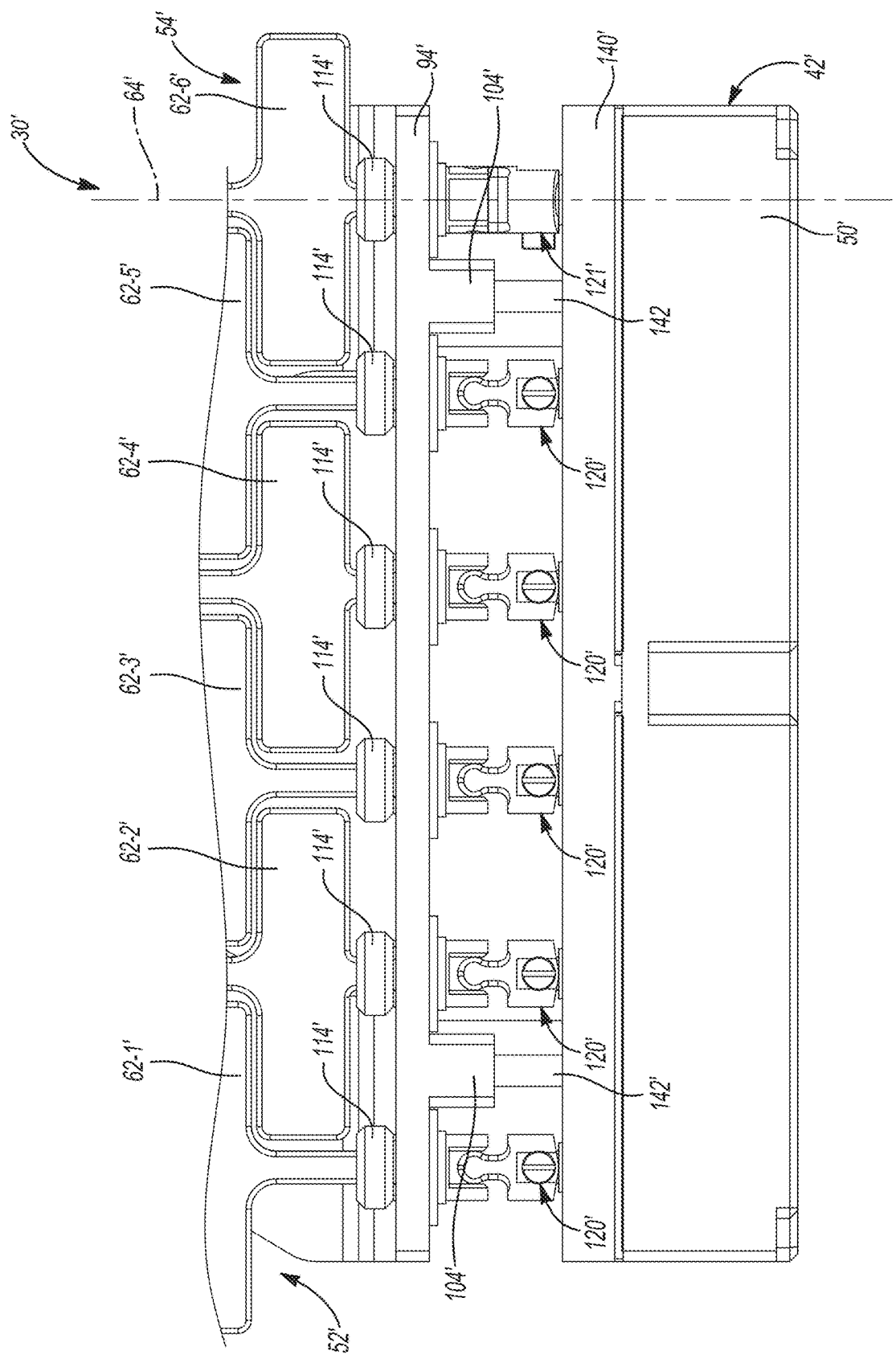
FIG. 4B is a partial top view of another conveyor assembly according to the principles of the present disclosure.

With reference to FIG. 4B, another conveyor assembly 30' according to various implementations of the present disclosure is shown. Unless otherwise described, the conveyor assembly 30' is similar to the conveyor assembly 30. The conveyor assembly 30' extends between a first side 52' and a second side 54'. The conveyor assembly 30' includes a gear assembly 42' having a gear housing 50. The conveyor assembly 30' further includes a paddle assembly including a housing and a plurality of paddles. The housing includes a rear wall 94', a locating pin receiving 104', and a plurality of spacers 114'. The plurality of paddles includes first, second, third, fourth, fifth, and sixth paddles 62-1', 62-2', 62-3', 62-4', 62-5', 62-6' rotatable about respective paddle axes 64'. The conveyor assembly 30' further includes a partition 140' and locating pins 142'.

The first, second, third, fourth, and fifth paddles 62-1', 62-2', 62-3', 62-4', 62-5' are operatively coupled to the gear assembly 42' by output couplers assemblies 120'. The sixth paddle 62-6' is operatively coupled to the gear assembly 42' by an output coupler assembly 121'. The output coupler assembly 121' is angularly rotated with respect to the output coupler assemblies 120' of the other paddles 62-1', 62-2', 62-3', 62-4', 62-5'. To install or remove the paddle assembly 40 from the electronics assembly 44, the sixth paddle 62-6' is rotated about 90° in a first rotational direction. Rotating the sixth paddle 62-6' by 90° orients the sixth paddle 62-6' vertically, thereby reducing a width of the paddle assembly in a first direction. The reduction in width is advantageous during removal and installation or reassembly because it provides clearance between the second side 54' of the paddle assembly and a first side of an adjacent paddle assembly (FIG. 1) or another component. The conveyor assembly 30' can be placed into a "cleaning mode" to rotate the sixth paddle 62-6' by 90° in the first rotational direction.

A conveyance system (such as the modular conveyance apparatus 16 of FIG. 1) may include a plurality of conveyor assemblies 30, a plurality of conveyor assemblies 30', or a combination of conveyor assemblies 30 and 30'. The conveyor assemblies 30, 30' may be arranged in any order depending on whether clearance is needed on a first side 52, 52' or a second side 54, 54' of the conveyor assembly 30, 30'.

Returning to FIG. 6, during reassembly of the paddle assembly 40 to the electronics assembly 44, the locating pins 142 are physically engaged with the respective locating pin receivers 104 of the paddle housing 60. Specifically, a head 200 of each locating pin 142 is at least partially disposed within a third receptacle 202 of the locating pin receiver. The head 200 engages the third receptacle 202 to constrain motion of the paddle assembly 40 parallel to the paddle axes 64, parallel to the first direction 28, and perpendicular to the paddle axes 64 and the first direction 28.

Figure 7:
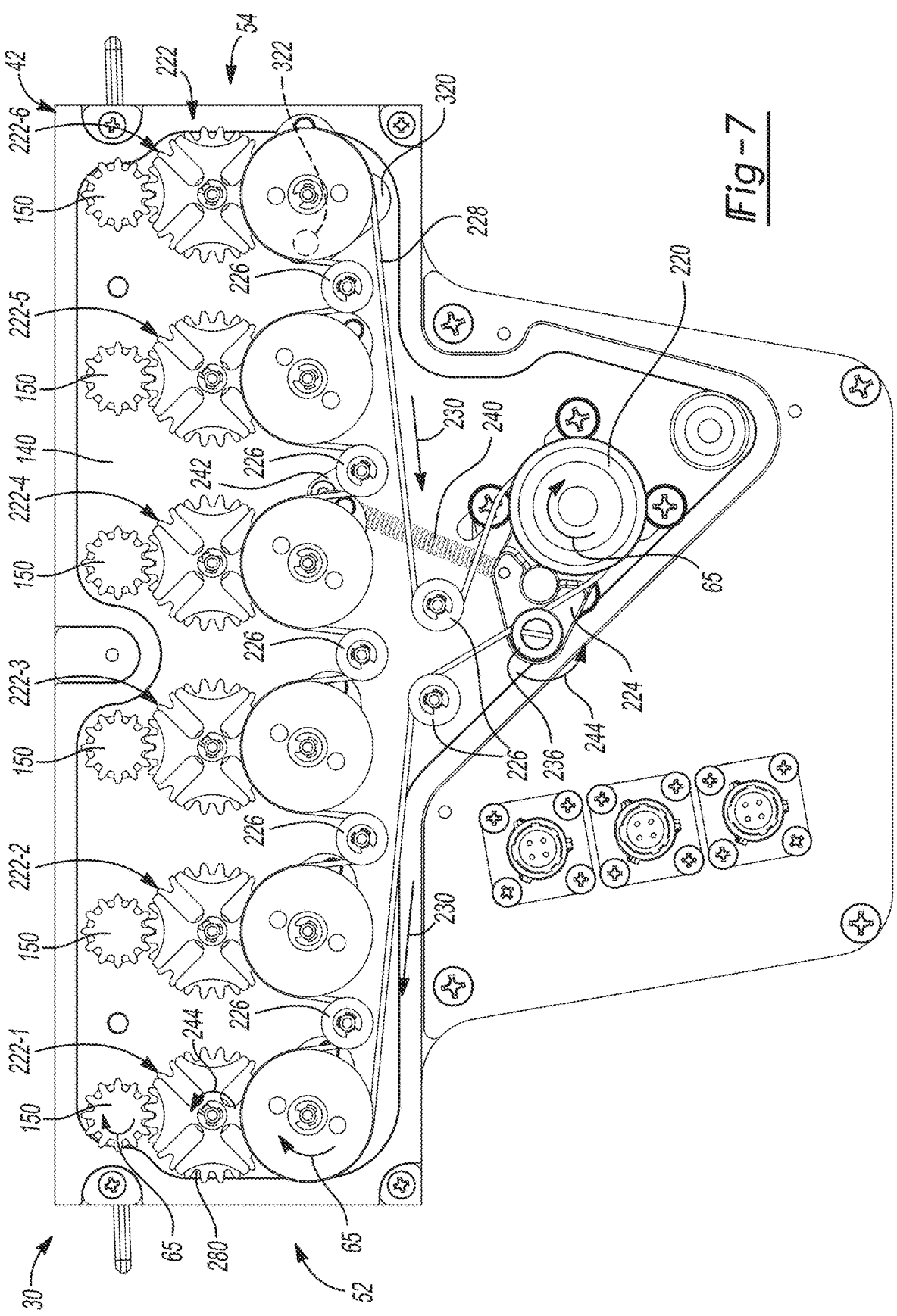
FIG. 7 is a rear view of a gear assembly of the conveyor assembly of FIG. 7.

Referring to FIG. 7, the gear assembly 42 with portions of the gear housing 50 removed as viewed from the rear side 124 of the conveyor assembly 30 is shown. The gear assembly 42 generally includes an input gear 220, a plurality of Geneva mechanisms 222, the plurality of output gears 150, a tensioner 224, a plurality of idler pulleys 226, and a toothed belt 228. During operation, the motor 48 provides torque to the input gear 220 to rotate it in the first rotational direction 65. During rotation, the input gear 220 operatively engages the toothed belt 228 to move the toothed belt 228 as indicated by the arrows 230. The toothed belt 228 drives the Geneva mechanisms 222 to cause incremental rotation of the paddles 62.

Figure 8:
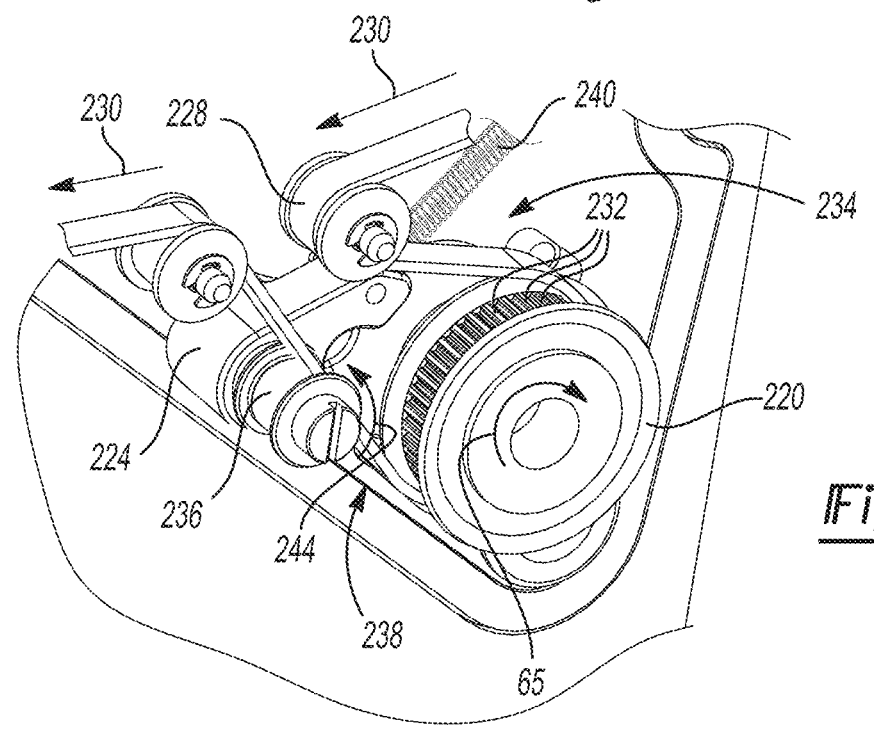
FIG. 8 is a partial perspective view of the gear assembly of FIG. 7.

As shown in FIG. 8, a circumferential surface of the input gear 220 defines a plurality of teeth 232 that engaged the toothed belt 228. As the motor 48 drives the input gear 220 in the first rotational direction 65, the teeth 232 engage the toothed belt 228 on a tension side 234 of the input gear 220. The toothed belt 228 engages a tensioner pulley 236 on a slack side 238 of the input gear 220.

Returning to FIG. 7, the tensioner 224 is pivotable with respect to the partition 140. The tensioner 224 is connected to an extension spring 240. The extension spring 240 extends between the tensioner 224 and a spring connector 242. The extension spring 240 biases the tensioner 224 in a fourth rotational direction 244 opposite the first rotational direction 65. Pivoting of the tensioner 224 in the fourth rotational direction 244 causes the tensioner pulley 236 to engage the toothed belt 228 to reduce or eliminate slack. In various implementations, the tensioner 224 is referred to as a "slack side tensioner."

The Geneva mechanisms 222 convert the continuous rotary motion into intermittent rotary motion. Each of the six paddles 62 has its own Geneva mechanism 222. With reference to FIGS. 2 and 7, the first paddle 62-1 is operatively connected to a first Geneva mechanism 222-1. The second paddle 62-2 is operatively connected to a second Geneva mechanism 222-2. The third paddle 62-3 is operatively connected to a third Geneva mechanism 222-3. The fourth paddle 62-4 is operatively connected to a fourth Geneva mechanism 222-4. The fifth paddle 62-5 is operatively connected to a fifth Geneva mechanism 222-5. The sixth paddle 62-6 is operatively connected to a sixth Geneva mechanism 222-6.

Figure 9:
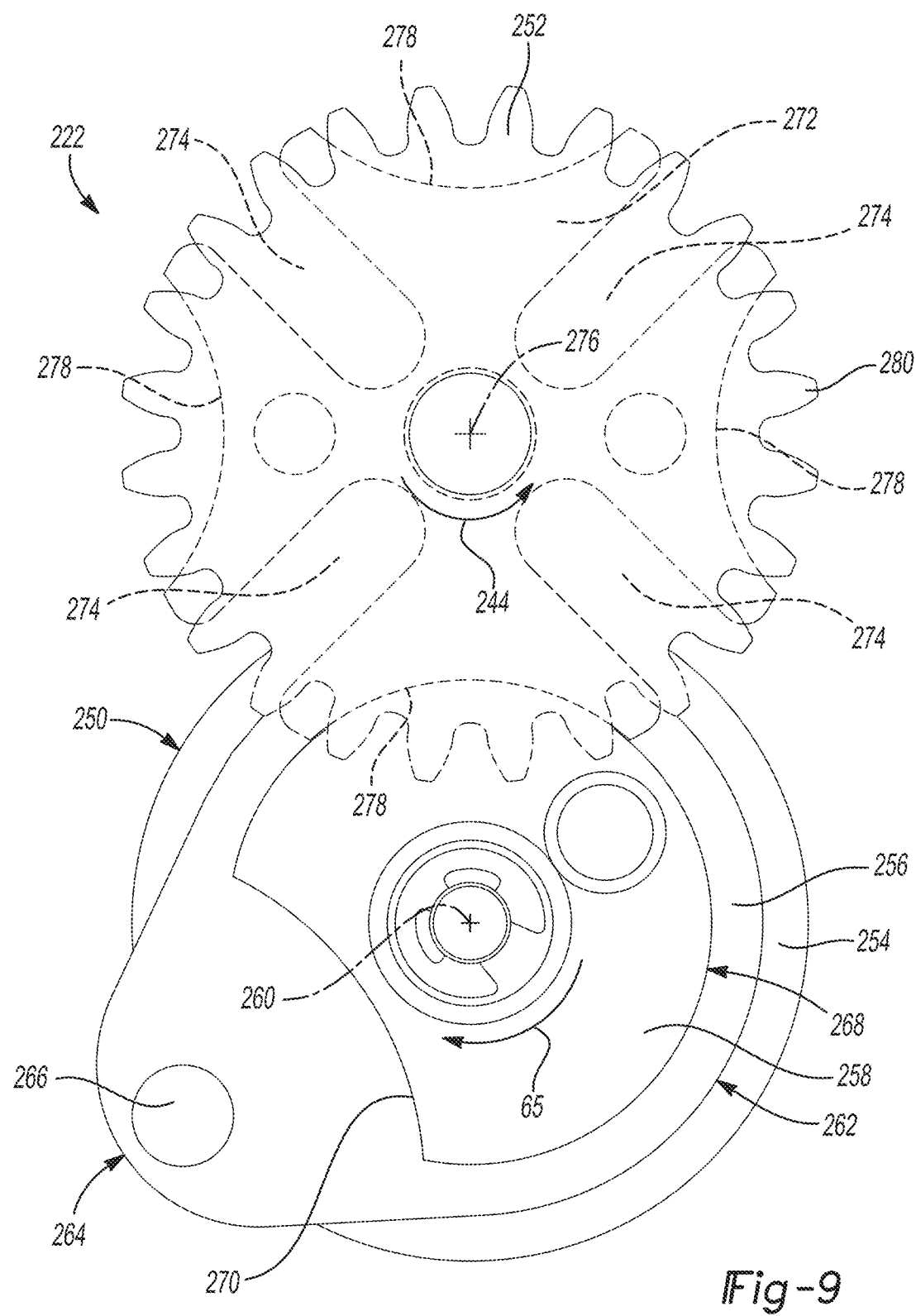
FIG. 9 is a front view of a Geneva mechanism of the gear assembly of FIG. 7.

With reference to FIG. 9, the Geneva mechanism 222 as viewed from the front side 122 of the gear assembly 42 is shown. The Geneva mechanism 222 generally includes a Geneva driver 250 and a Geneva wheel 252. The Geneva driver 250 includes a belt-engagement gear 254, a locking arm 256, and a locking cam 258. The belt-engagement gear 254, locking arm 256, and locking cam 258 are arranged along a common axis 260 that extends substantially parallel to the pivot axes 64. The belt-engagement gear 254, locking arm 256, and locking cam 258 are configured to rotate together with one another about the common axis 260. The locking arm 256 is disposed between the belt-engagement gear 254 and the locking cam 258.

The belt-engagement gear 254 has a circular cross section perpendicular to the common axis 260. The belt-engagement gear 254 is driven in the first rotational direction 65 by operable engagement with the toothed belt 228 (FIG. 7). The locking arm 256 defines a tear drop-shaped cross section perpendicular to the common axis 260. Thus, the locking arm 256 includes a rounded portion 262 and a cusp portion 264. A radius of the locking cam 258 at the cusp portion 264 is greater than a radius of the locking cam 258 at the rounded portion 262. A drive pin 266 is coupled to the locking arm 256 at the cusp portion 264. The drive pin 266 is configured to rotate about the common axis 260 together with the locking arm 256. The locking cam 258 includes a circular portion 268 that is convex with respect to the common axis 260 and a clearance surface 270 that is concave with respect to the common axis 260.

The Geneva wheel 252 has a raised portion 272 that defines a plurality of radial slots 274. The plurality of radial slots 274 may include four slots 274. The slots 274 may be substantially equally circumferentially spaced about a Geneva axis 276 about which the Geneva wheel 252 is configured to rotate. The Geneva wheel 252 also includes a plurality of locking surfaces 278 that are alternatingly circumferentially disposed with respect to the radial slots 274. Thus, the plurality of locking surfaces 278 may include four locking surfaces 278. Each locking surface 278 is concave with respect to the Geneva axis 276. The locking surfaces 278 are configured to engage the rounded portion 262 of the locking cam 258. Thus, curvature of each of the locking surfaces 278 is complementary to curvature of the rounded portion 262 of the locking cam 258.

During operation, the Geneva driver 250 rotates in the first rotational direction 65. While the rounded portion 262 of the locking cam 258 engages the locking surface 278 of the Geneva wheel 252, the Geneva wheel 252 remains stationary. That is, the Geneva wheel 252 does not rotate about the Geneva axis 276. The drive pin 266 is configured to rotate into the radial slots 274 and operatively engage a surface of the radial slot 274. Engagement of the drive pin 266 with the surface of the radial slot 274 causes the Geneva wheel 252 to rotate about the Geneva axis 276 in the fourth rotational direction 244. Once the Geneva wheel 252 has rotated about 90° in the fourth rotational direction 244, the drive pin 266 slides out of and disengages the radial slot 274 and the Geneva wheel 252 ceases rotation in the fourth rotational direction 244. During a complete 360° rotation of the Geneva driver 250, the drive pin 266 rotates into and out of each of the respective radial slots 274. Thus, a rotational pattern of the Geneva wheel 252 may be: hold-rotate 90°-hold-rotate 90°-hold-rotate 90°-hold-rotate 90°. Orientations of the Geneva mechanisms 222 may be preset depending on desired angular offsets (not shown). Thus, each Geneva mechanism 222 may have a different orientation than adjacent Geneva mechanisms 222.

Each Geneva wheel 252 includes a toothed outer surface 280. Returning to FIG. 7, the toothed outer surface 280 of the Geneva wheel operatively engages the output gear 150. A gear ratio between the output gear 150 and the Geneva wheel 252 may be in a range of 1:1-1:4. Other gear ratios may be used when the Geneva wheel 252 includes different quantities of radial slots 274. In various implementations, each incremental 90° rotation of the Geneva wheel 252 causes about a 180° rotation of the output gear 150. Rotation of the output gear 150 causes rotation of the paddle 62 about the paddle axis 64.

Prior to operation of the conveyor assembly 30, the plurality of paddles 62 may be arranged horizontally so that each paddle 62 has its first surface 76 facing upward (away from the base 96). During a cycle of operation, each paddle 62 individually and sequentially rotates in an increment of about 180°. During sequential operation, the paddles 62 begin rotation at different and sequential times, such as beginning with a paddle 62 closest to the first side 52 and ending with a paddle closest to the second side 54. The paddles 62 may rotate concurrently, as described below, as long as start times of adjacent paddles are offset. In various other implementations, each paddle 62 may complete a 180° rotation prior to an adjacent paddle 62 beginning rotation.

During operation of the conveyor assembly 30, the first Geneva mechanism 222-1 causes the first paddle 62-1 to rotate in the first rotational direction 65. Once the first paddle 62-1 has rotated through a first predetermined angle, the second Geneva mechanism 222-2 begins to rotate, causing the second paddle 62-2 to rotate in the first rotational direction 65. Once the second paddle 62-2 has rotated through the first predetermined angle, the first paddle 62-1 ceases rotation with its second surface 78 facing upward, and the third paddle 62-3 begins to rotate. Once the third paddle 62-3 has rotated the predetermined angle, the second paddle 62-2 ceases rotation with its second surface 78 facing upward and the fourth paddle 62-4 begins to rotate. The pattern continues until each of the paddles 62 has rotated about 180° and the second surfaces 78 are all facing upward. In various implementations, the predetermined angle may be greater than or equal to about 80° to less than or equal to about 100°, optionally greater than or equal to about 85° to less than or equal to about 95°, or optionally about 90°.

Figure 10:
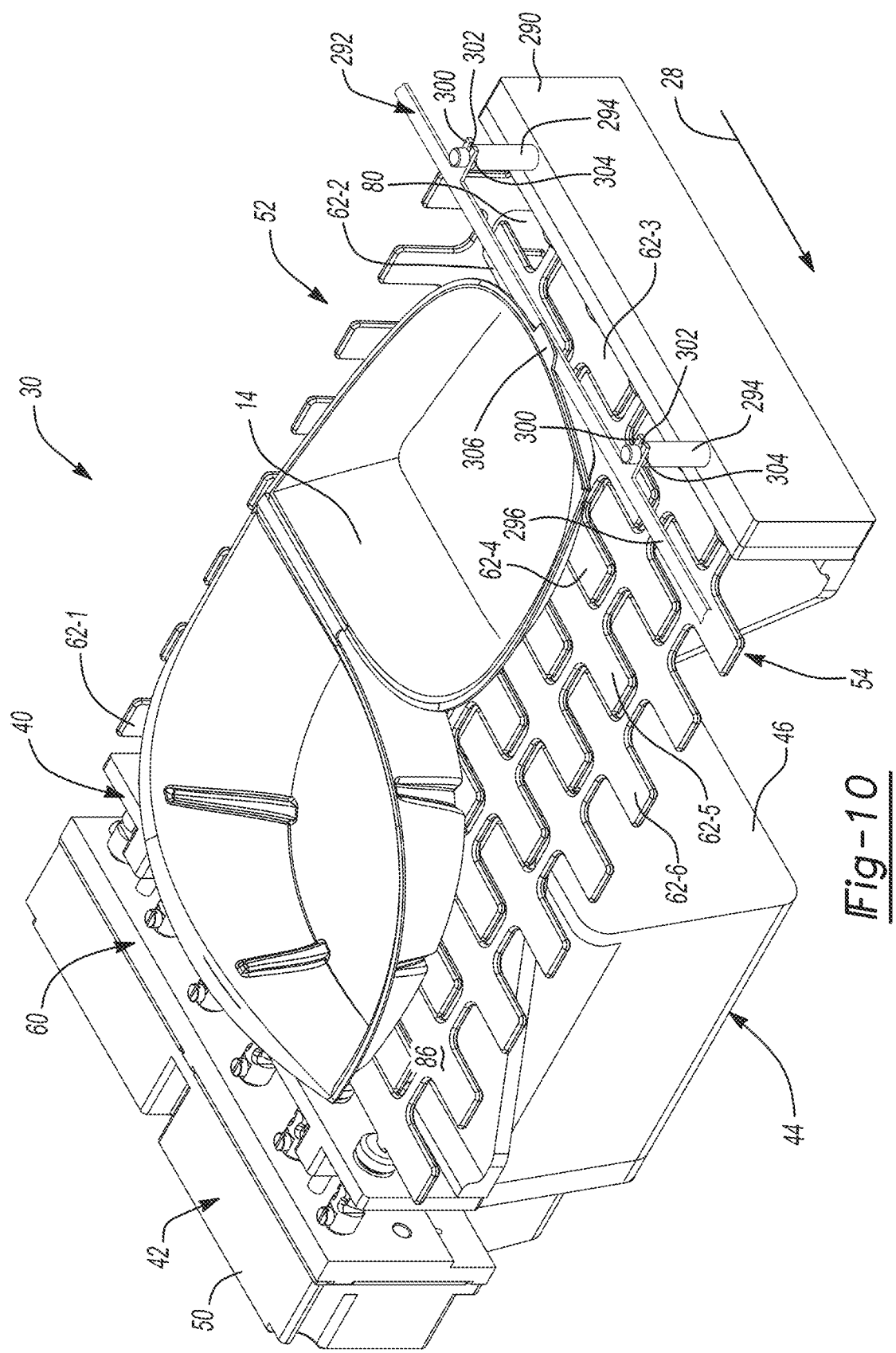
FIG. 10 is a perspective view of the conveyor assembly of FIG. 2 translating a box.

With reference to FIG. 10, the conveyor assembly 30 may further include a barrier 290 disposed adjacent to the first wall 92 of the paddle housing 60. A guide assembly 292 is coupled to the barrier 290. The guide assembly 292 includes a plurality of posts 294 and a bumper 296. The bumper 296 includes a plurality of tabs 300 defining slots 302. The slots 302 are disposed around grooves 304 of respective posts 294 to couple the bumper 296 to the posts 294.

The bumper 296 projects over the first wall 92 toward the second wall 94 and optionally over a portion of the conveyor surface 86. The bumper 296 is elongated and extends substantially parallel to the first direction 28. In various implementations, a single bumper 296 may be shared among a plurality of adjacent conveyor assemblies 30. The bumper 296 is configured to engage a portion of the box 14, such as a side of the box 14 under a locking tab 306 to facilitate lateral alignment of the box 14 (that is, substantially parallel to the first direction 28).

During operation of the conveyor assembly 30, at least one of the paddles 62 may pause at a second predetermined angle. In various implementations, the second predetermined angle may be greater than or equal to about 45° to less than or equal to about 90°. For example, the first paddle 62-1 is disposed at a second predetermined angle of about 90° in FIG. 10. At the second predetermined angle, the paddle 62 is configured to engage a portion of the box 14 facilitate longitudinal alignment of the box 14 (that is, substantially parallel to the paddle axes 64). The paddle 62 may remain paused for a predetermined amount of time, such as while foodstuffs are deposited into the box 14.

The present disclosure also provides a method of operating a modular conveyor apparatus including a conveyor assembly to translate a box. With continued reference to FIG. 10, the box 14 begins at the first side 52 of the conveyor surface 86. As the first paddle 62-1 rotates between 0° (horizontal) and 90° (vertical), the box 14 slides downward, at least partially onto the second paddle 62-2. As the first paddle 62-1 rotates between 90° and 180°, it pushes the box 14 in the first direction 28 further onto the second paddle 62-2. The box 14 continues to move across the second, third, fourth, fifth, and sixth paddles 62-2, 62-3, 62-4, 62-5, 62-6 in this manner until it has reached the second side 54 of the paddle assembly 40. If another conveyor assembly is disposed adjacent to the conveyor assembly 30 on the second side 54, as shown in FIG. 1, the box 14 can continue to move to be transported in the first direction 28. Since each conveyor assembly 30 operates independently of the other conveyor assemblies 30, the box 14 can be stopped on one conveyor assembly 30 while the other conveyor assemblies 30 continue operation. The box 14 can be transported continuously across the modular conveyor apparatus 16. Because the gaps 80 of a paddle 62 are open when an adjacent paddle 62 is vertical, toppings can fall through the paddle assembly 40 rather than being transported together with the box. The conveyor assembly 30 may include a tray (not shown) disposed below the paddles 62 that catches spare toppings.

During operation of the motor 48 (FIG. 4A), an angular displacement of the motor 48 is known. However, a position of the Geneva mechanisms 222 is unknown. Therefore, the gear assembly 42 can perform a homing process to ensure that the belt 128 is properly timed. Returning to FIG. 7, the sixth Geneva assembly 222-6 includes a Hall-effect sensor 320 and a magnet 322. The Hall-effect sensor 320 is fixed with respect to the partition 140. The magnet 322 is coupled to a front side of the Geneva driver 250 and is configured to rotate about the common axis 260 together with the Geneva driver 250.

Figure 11:
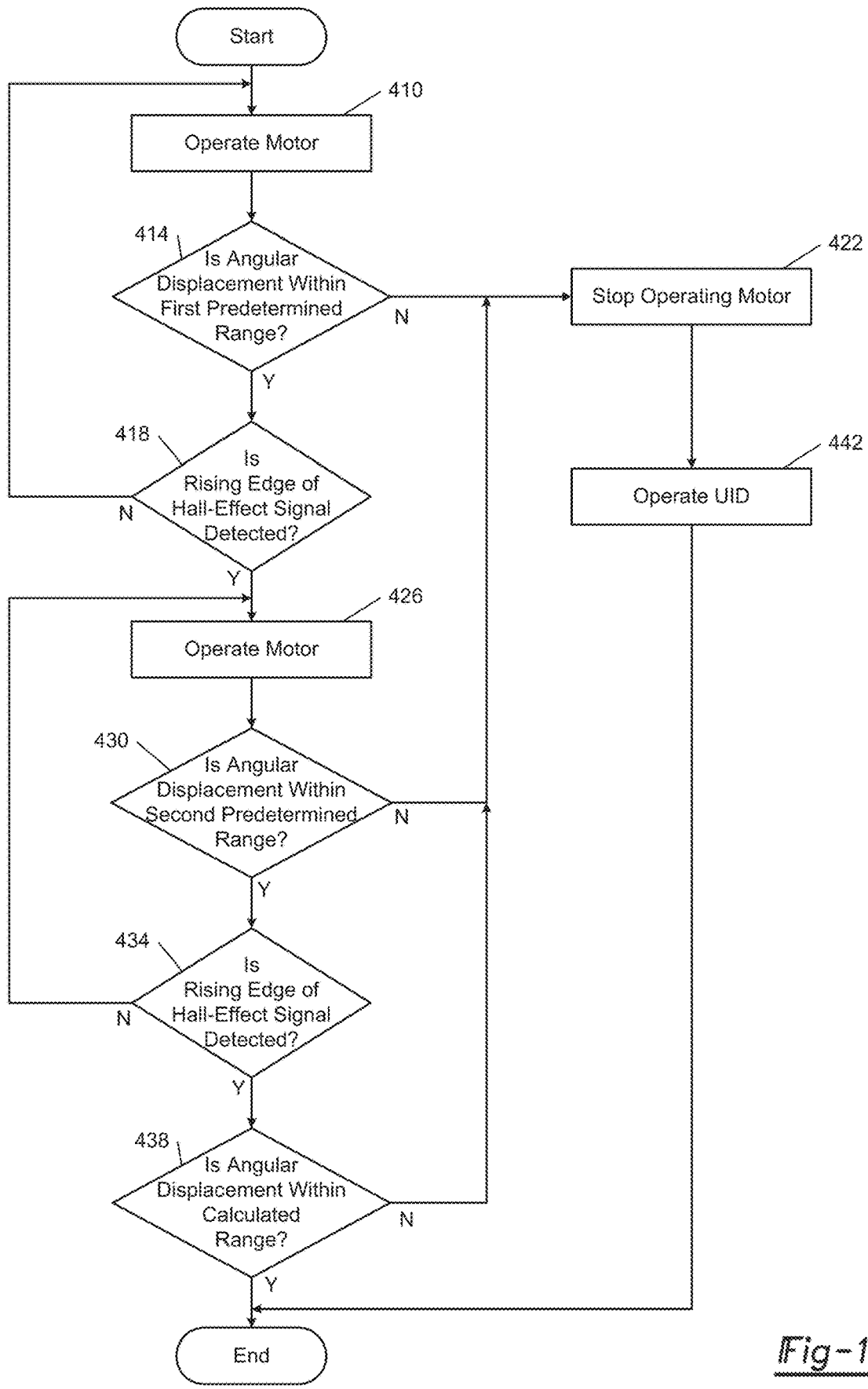
FIG. 11 is a flowchart of an example method of homing the gear assembly of FIG. 7 according to certain aspects of the present disclosure.

In various implementations, the present disclosure provides an example method of homing the gear assembly 42. The method may be performed by a control module, which may include multiple submodules, not shown or described herein. In FIG. 11, control begins at 410, where the control module operates the motor 48. The method continues at 414.

At 414, the control module determines whether the angular displacement of the motor 48 is within a first predetermined range. Step 414 ensures that the motor 48 does not operate indefinitely during the homing method. If the angular displacement of the motor 48 is within the first predetermined range, the method continues at 418. Else, the method continues at 422.

At 418, the control module determines whether a rising edge of the Hall-effect sensor 320 signal is detected. Detection of the rising edge of the Hall-effect sensor 320 signal enables the control module to correlate the angular position of the motor 48 and the position of the gear assembly 42. If the rising edge of the Hall-effect sensor 320 signal is detected, the method continues at 426. Else, the method returns to 410.

At 426, the control module operates the motor 48. The method continues at 430. At 430, the control module determines whether the angular displacement of the motor 48 is within a second predetermined range. Step 426 ensures that the motor 48 does not operate indefinitely during the homing method. If the angular displacement of the motor 48 is within the second predetermined range, the method continues at 434. Else, the method continues at 422.

At 434, the control module determines whether a rising edge of the Hall-effect sensor 320 signal is detected. Detection of the rising edge of the Hall-effect sensor 320 signal enables the control module to correlate the angular position of the motor 48 and the position of the gear assembly 42. If the rising edge of the Hall-effect sensor 320 signal is detected, the method continues at 438. Else, the method continues at 426.

At 438, the control module determines whether the angular displacement of the motor 48 is within a calculated range. The calculated range corresponds to an expected angular displacement based on the difference between the angular displacement at step 434 and the angular displacement at step 418. The calculate range also accounts for error. If the angular displacement is within the calculated range, then the gear assembly 42 is operating as expected. The method ends. Else, the method continues at 422.

At 422, the control module stops operating the motor 48. The method continues at 442. At 442, the control module operates a user interface device (UID) to notify an operator that the conveyor assembly 30 may require maintenance. The method ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:
1. A conveyor assembly comprising:
 a motor;
 a gear assembly operatively coupled to the motor; and
 a paddle assembly including:
  a housing including a first wall and a second wall opposite the first wall; and
  a plurality of paddles disposed at least partially within the housing and operatively coupled to the gear assembly, wherein:
 each paddle of the plurality of paddles:
  extends longitudinally between the first wall and the second wall and
  includes a plurality of substantially planar blades, a shaft extending through a center of each blade, and a plurality of gaps,
  the plurality of blades and the plurality of gaps are alternatingly disposed along the shaft, a first portion of the plurality of paddles includes a first portion of the plurality of blades and a first portion of the plurality of gaps, a second portion of the plurality of paddles includes a second portion of the plurality of blades and a second portion of the plurality of gaps, the first portion of the plurality of blades are configured to rotate through the second portion of the plurality of gaps, the second portion of the plurality of blades are configured to rotate through the first portion of the plurality of gaps, and the plurality of paddles is configured to sequentially rotate about the respective plurality of paddle axes such that each paddle is configured to be disposed at a different angular position than an adjacent paddle.

2. The conveyor assembly of claim 1 wherein the plurality of paddles is configured to support an object and translate the object in a lateral direction substantially perpendicular to the paddle axes.

3. The conveyor assembly of claim 1 wherein:
the gear assembly includes an input gear and a plurality of Geneva mechanisms,
each Geneva mechanism is operatively engaged with a respective paddle of the plurality of paddles, and
each Geneva mechanism is configured to rotate the respective paddle about the respective paddle axis by a predetermined increment while maintaining an orientation of at least one other paddle.

4. The conveyor assembly of claim 3 wherein the predetermined increment is about 180°.

5. The conveyor assembly of claim 3 wherein the gear assembly further includes a toothed belt configured to operatively engage the input gear and the plurality of Geneva mechanisms.

6. The conveyor assembly of claim 1 wherein each paddle of the plurality of paddles is configured to have an angular position that is offset from an angular position of an adjacent paddle of the plurality of paddles by greater than or equal to about 85° to less than or equal to about 95°.

7. The conveyor assembly of claim 1 wherein each paddle of the plurality of paddles is coupled to the gear assembly via a respective output coupler assembly such that the paddle is configured to translate along an output axis substantially parallel to the paddle axes and pivot about the output axis.

8. The conveyor assembly of claim 7 wherein:
each output assembly includes an output gear operatively engaging the gear assembly, a first coupling pivotally coupled to the output gear and configured to rotate together with the output gear, and a second coupling slidably coupled to the first coupling and configured to translate substantially parallel to the output axis, and
the second coupling is operatively coupled to the respective paddle of the plurality of paddles.

9. The conveyor assembly of claim 7 wherein an orientation of at least one output coupler assembly is angularly offset by about 90° about the respective paddle axis with respect to an adjacent output coupler assembly.

10. The conveyor assembly of claim 1 wherein the paddle assembly is removably coupled to the gear assembly.

11. The conveyor assembly of claim 10 wherein:
one of the paddle assembly and the gear assembly includes a plurality of pins,
the other of the paddle assembly and the gear assembly includes a plurality of receivers, and the plurality of pins is configured to be disposed in the plurality of receivers, respectively, to align the paddle assembly with the gear assembly.

12. The conveyor assembly of claim 1 wherein:
the housing further includes a base connecting the first wall and the second wall,
the base extends substantially perpendicular to the first wall and the second wall, and
the base defines a plurality of openings.

13. The conveyor assembly of claim 12 wherein the base has an X-shaped profile.

14. The conveyor assembly of claim 1 wherein the paddles of the plurality of paddles are configured to cooperate to define a substantially planar surface.

15. The conveyor assembly of claim 14 wherein rotation of the plurality of paddles is configured to be paused such that at least one paddle is disposed at an angle to the substantially planar surface, the angle being greater than or equal to about 85° to less than or equal to about 95°.

16. The conveyor assembly of claim 14 wherein the substantially planar surface defines a plurality openings.

17. The conveyor assembly of claim 1 wherein a plurality of paddles includes six paddles.

18. A modular conveyor apparatus comprising:
a plurality of conveyor assemblies disposed laterally adjacent to one another and configured to cooperate to define a substantially planar surface, each conveyor assembly including:
a motor,
a gear assembly operatively coupled to the motor, and
a paddle assembly including:
a housing including a first wall and a second wall opposite the first wall; and
a plurality of paddles disposed at least partially within the housing, operatively coupled to the gear assembly, and, each paddle of the plurality of paddles extending longitudinally between the first wall and the second wall and including a plurality of substantially planar blades, a shaft extending through a center of each blade, and a plurality of gaps, the plurality of blades and the plurality of gaps being alternatingly disposed along the shaft, wherein:
a first portion of the plurality of paddles includes a first portion of the plurality of blades and a first portion of the plurality of gaps,
a second portion of the plurality of paddles includes a second portion of the plurality of blades and a second portion of the plurality of gaps,
the first portion of the plurality of blades is configured to rotate through the second portion of the plurality of gaps,
the second portion of the plurality of blades is configured to rotate through the first portion of the plurality of gaps, and
the plurality of paddles is configured to sequentially rotate about the respective plurality of paddle axes such that each paddle is configured to be disposed at a different angular position than an adjacent paddle.

19. The modular conveyor apparatus of claim 18 wherein the plurality of paddles of each respective conveyor assembly is configured to rotate independent of the plurality of paddles of each other conveyor assembly.

20. The modular conveyor apparatus of claim 18 wherein:
the respective gear assembly of each conveyor assembly includes an input gear and a plurality of Geneva mechanisms, each Geneva mechanism is operatively engaged with a respective paddle of the plurality of paddles, and each Geneva mechanism is configured to rotate the respective paddle about the respective paddle axis by a predetermined increment.

21. The modular conveyor apparatus of claim 18 wherein the pluralities of paddles of each respective conveyor assembly are configured to cooperate to support an object and translate the object in a lateral direction substantially perpendicular to the paddle axes.

22. The modular conveyor apparatus of claim 18 wherein each conveyor assembly of the plurality of conveyor assemblies is configured to be operated independently of each other conveyor assembly of the plurality of conveyor assemblies.

* * * * *